United States Patent [19]

Berry

[11] Patent Number: 5,559,726
[45] Date of Patent: Sep. 24, 1996

[54] METHOD AND SYSTEM FOR DETECTING WHETHER A PARAMETER IS SET APPROPRIATELY IN A COMPUTER SYSTEM

[75] Inventor: Robert F. Berry, Austin, Tex.

[73] Assignee: International Business Machines Corporation, Armonk, N.Y.

[21] Appl. No.: 301,094

[22] Filed: Sep. 6, 1994

[51] Int. Cl.$^6$ ..................................................... G06F 11/34
[52] U.S. Cl. ...................................... 364/554; 364/551.01
[58] Field of Search ........................................ 364/300, 402, 364/554, 551.01; 375/340; 395/650

[56] References Cited

U.S. PATENT DOCUMENTS

| | | | |
|---|---|---|---|
| 4,769,761 | 9/1988 | Downes et al. | 364/514 |
| 4,890,227 | 12/1989 | Watanabe et al. | 364/300 |
| 5,231,402 | 7/1993 | Ludloff et al. | 342/192 |
| 5,301,323 | 5/1994 | Maeurer et al. | 395/650 |
| 5,406,476 | 4/1995 | Deziel, Jr. et al. | 364/402 |
| 5,455,846 | 10/1995 | Gardner | 375/340 |

OTHER PUBLICATIONS

Hac, A. "Distributed algorithm for managing resources in a hierarchial network" 1993, pp. 191–206, Honolulu, HI, U.S.A.

Primary Examiner—Emanuel T. Voeltz
Assistant Examiner—Demetra R. Smith
Attorney, Agent, or Firm—Benman Collins & Sawyer

[57] ABSTRACT

A method and system is provided that detects whether a resource is exceeding a threshold setting of a particular parameter a computer system. In such a system, the resource requests of the plurality of users are tracked. A mean and a variance is then estimated from a distribution of the plurality of users requests. The probability that any resource sample from the distribution exceeds a predetermined threshold is then derived. From this determination a report is generated as to whether the threshold is set at an appropriate level.

13 Claims, 8 Drawing Sheets

METHOD AND SYSTEM FOR DETECTING WHETHER A PARAMETER IS SET APPROPRIATELY IN A COMPUTER SYSTEM

FIELD OF THE INVENTION

The present invention relates generally to diagnosing the performance of a computer system and more particularly to the detection of existing and imminent performance problems.

BACKGROUND OF THE INVENTION

Operating systems associated with computers sometimes fail to deliver the expected level of performance. There are many reasons for the performance level not being at the expected level. Some reasons for the performance problems are changes in workload, the occurrence of hardware or software errors, under-configuration (e.g., too little memory), configuration errors, lack of tuning, and over-commitment of resources. Addressing these problems requires first that they be detected (or anticipated, if possible); then that the reasons for their occurrence be identified; next, steps are taken to remedy the situation; and finally, the fix must be verified.

Detection of performance problems is difficult. The relevant data is not centrally available in many computer systems such as UNIX systems or the like. Further, the interpretation of that data often requires expertise not commonly associated with system administration. However, identifying performance problems is important, for their presence diminishes a customer's investment in a computer system by robbing the customer of purchased resources.

Performance and configuration data are required to effectively diagnose the performance of the computer system. This data is typically available on a computer system from a large number of sources. Typically in a UNIX computer system, the data is provided in many different types of formats.

In order to obtain this diagnostic information, the diagnostic system must be able to collect the data from the resource manager regardless of the format. Accordingly, additional complexity must be build into each of the data sources to provide for integrated (seamless) access to each of the different formats that could be provided. This additional complexity can considerably increase the cost when providing performance diagnosis and consequently, the overall system.

A common type of parameter in operating system control is a simple threshold parameter. Typically, such a threshold defines an absolute limit for some process, user's resource consumption or overall system. It is often the case, however, that no statistics are maintained on the number of times that processes (or users, or whatever resource consumer) reached that limit.

Knowledge of these limits, and their effects on workloads, is important for several reasons. The threshold might be set too low; that is, there might be sufficient resources on the system to support a higher level of use—but the threshold is exerting an unnecessary constraint on resource consumption. The threshold might not be having any effect at all (that is, it might be set too high). With no statistics maintained on (attempted) threshold violations, it is difficult to determine whether or not the threshold has an appropriate setting.

Accordingly, what is needed is a method and system that detects whether a particular threshold setting of a computer system is appropriately set. The process should be such that it does not add significant cost and complexity to the operation of the computer system. The present invention addresses such a need.

SUMMARY OF THE INVENTION

A method and system for detecting whether a threshold parameter is appropriate in an operating system is provided. The system comprises collecting granted resource requests of the plurality of users; estimating a mean and a variance from a distribution of the plurality of granted resource requests; and determining a probability that future resource requests might exceed a predetermined threshold parameter. Through this system a process/user that is likely to exceed the threshold parameter can be identified. Thus a system administrator or the like can then either reset the threshold parameter or determine whether a process/user in the computer system is performing an activity that is inappropriate.

DETAILED DESCRIPTION

The present invention relates to an improvement in detecting problems with the performance of an operating system of a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A method and system is provided in accordance with the present invention that will detect whether a threshold parameter is inappropriately set. In so doing, a system administrator or the like could then either reset the threshold parameter to an appropriate level or the administrator could perform other evaluations on the computer system to determine if the excessive resource consumption (indicated by the threshold parameter likely being exceeded) is causing other problems in the computer system.

Figure 1:
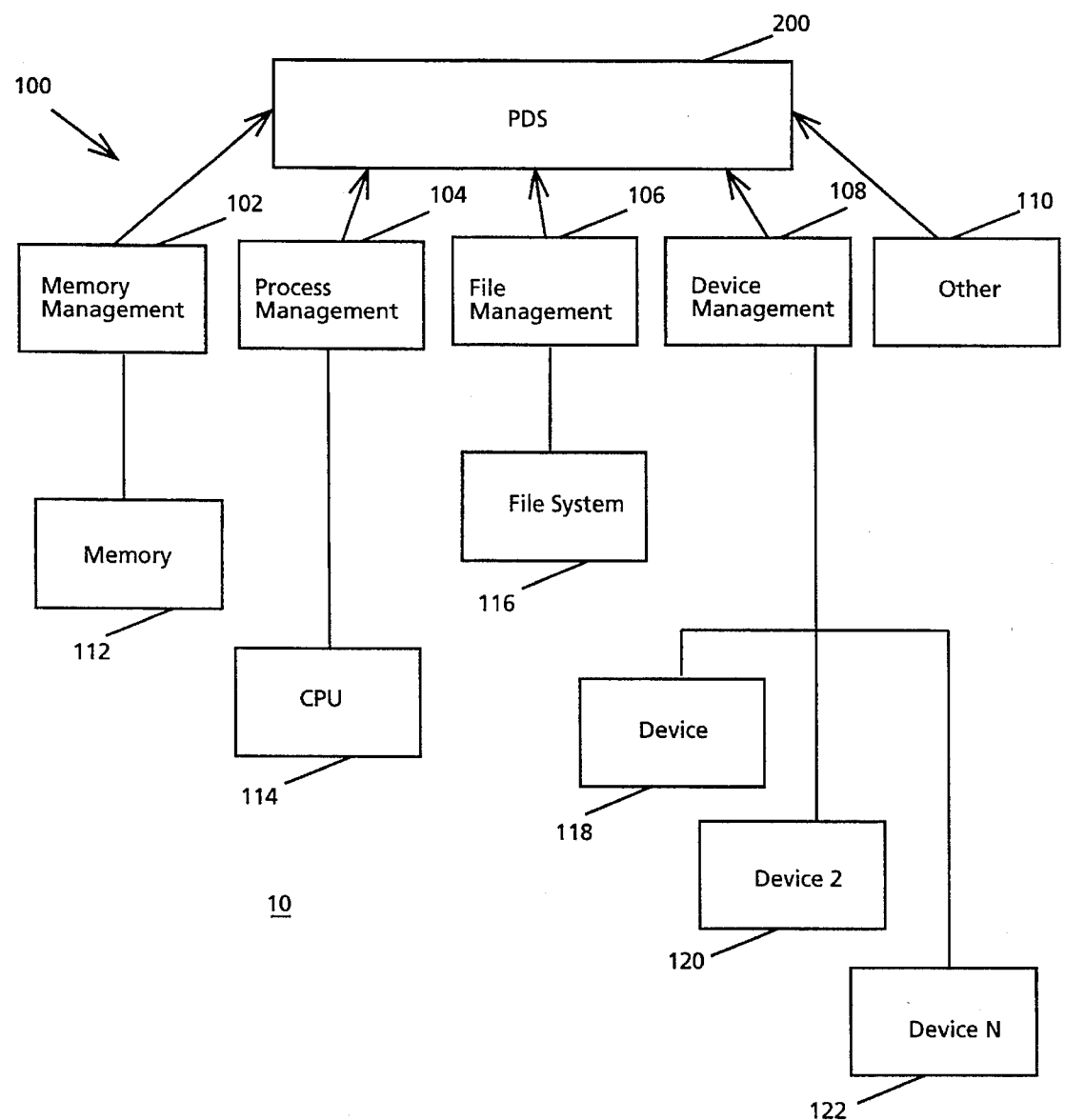
FIG. 1 is a block diagram of a computer system including a performance diagnostic system (PDS) in accordance with the present invention.

To more fully understand the operation of the present invention in the context of a particular environment, refer now to FIG. 1 which shows a computer system 10 which comprises an operating system 100. The operating system comprises a plurality of resource managers 102, 104, 106, 108 and 110. Each of the resource managers 102–110 controls the resource with which it is associated. Therefore, as is seen in this embodiment, the memory manager 102 controls the allocation memory 112, the process manager 104 controls the use and allocation of a central processing unit (CPU) 114, the file manager 106 controls a file system 116 and the device manager 108 controls a plurality of devices 118. It should be understood that the above-described resource managers 102–110 of the operating system 100 are illustrative of the types of resource managers that are present in a computer. Accordingly, one of ordinary skill in the art readily recognizes that other resource managers could be part of the operating system and their use would be within the spirit and scope of the present invention.

A performance diagnosis system (PDS) 200 is coupled to the resource managers 102–110 of the operating system 100. The PDS 200 is described in detail in co-pending U.S. patent application Ser. No. 08/301,089, entitled A METHOD AND SYSTEM FOR PROVIDING PERFORMANCE DIAGNOSIS OF A COMPUTER SYSTEM, the contents of which are incorporated by reference herein.

Figure 2:
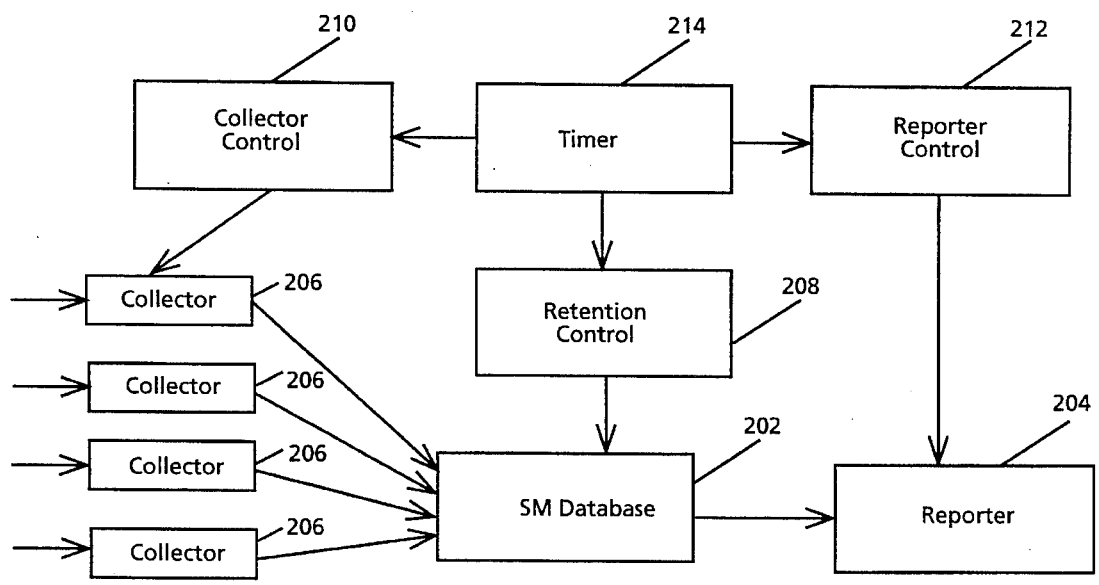
FIG. 2 is a detailed block diagram of the PDS in accordance with the present invention.

The PDS 200 is utilized to detect and report the presence of undesirable performance characteristics of an operating system of a computer. In addition, the PDS 200 is capable of performing a preliminary diagnosis. To specifically describe operation of PDS 200 refer now to FIG. 2 which is a more detailed block diagram of the PDS 200.

In this embodiment, the PDS 200 includes a system model (SM) database 202. The SM database 202 comprises a historical database of performance and configuration information from the resource managers 102–110 (FIG. 1). All reports are produced from data in the SM database 202 via reporter 204. A plurality of collectors 206 periodically updates the SM database 202 with new records. Periodically, a retention control unit 208 is activated that determines which of the records in the SM database 202 are to be kept, and which are to be removed. In one embodiment, there is no archival of records that are removed (however, a backup copy of the SM database 202 file is made prior to the running of the retention control unit 208). But in a preferred embodiment, it is conceivable archival records will be kept. Also periodically, the reporter 204 produces the current report. The last report is renamed (as a simple 'backup' measure) when the current report is produced.

All periodic activities are governed by the retention control unit 208, collector control unit 210 and reporter control unit 212 that are, in turn, driven by entries in a timer table 214 for user administration. The collectors 206 use an application program interface (API) associated with the SM database 202 for inserting SM records into the SM database 202. The reporter uses the API to query the SM database 202. The retention control unit 208 removes old information from the database. The SM database 202 in one preferred embodiment is a simple flat file that can be written to, read from, and rewritten. In a preferred embodiment, the SM database 202 would incorporate a complete database.

The PDS 200 is utilized to provide reports that will help identify and analyze performance problems in a computer system. Through the cooperation of the various elements of the PDS 200, it can detect and report undesirable performance characteristics and can also provide a preliminary diagnosis of the detected problems. To more particularly describe the operation of the PDS 200 the operation of the various elements will be described herein below.

SM Database 202

SM database 202 contains historical performance and configuration information collected from the resource managers. Access to SM database 202 is through an application programming interface (SM API) 203. A database SM 202 and the SM API 203 cooperate in the following manner to provide access.

Additions: records are added by calling SM_ADD(record). (PDS 200 actually appends new records onto the SM database 202.)

Deletions: records are deleted by calling SM_DELETE(record). (PDS 200 deletes records through the retention control unit 208. Records are tagged for deletion based on their timestamps.)

Queries: the contents of SM are interrogated through the SM_QUERY call.
SM_QUERY(
 return,
 type_pattern,
 object_id_pattern,
 attribute_name_pattern,
 date_pattern)
where
 return—a return structure of N SM records
 type_pattern—a string indicating an explicit
  type name, OR
  a pattern, OR
  $ALL
 object_id_pattern—a string indicating an
  explicit id name, OR
  a pattern, OR
  $ALL
 attribute_name_pattern—a string indicating an
  explicit attribute id, OR
  a pattern, OR
  $ALL
 date_pattern—an explicit timestamp structure, OR
  $LAST, OR
  $ALL SM record structure, type names, object ids, attribute ids and timestamps are discussed below.

Each SM_Query returns a structure (a list) of SM records matching the pattern. The structure of the SM, and the SM_Query api provide considerable flexibility. For example, A query for the most recent sizes of all file systems:
 SM_QUERY(return,FS,$ALL,size,$LAST)

A query for all historical values for the file system hd0 [suitable for trend analysis, e.g.]:
 SM_QUERY(return,FS,hd0,size,$ALL)

A query for all delay measures (regardless of object):
 SM_QUERY(return,$ALL,$ALL,delay,$LAST).

In a preferred embodiment, all entries in the SM database have the same basic format. A typical format for a UNIX-based system is shown below for illustrative purpose.
 type object_id hour day_of_week week_of_year
  month_of_year year julian_day attribute_value version collection_attributes
where:

1. type=type of object for which data is recorded. There are several base types reflected in the database, including:

PS—page space
   PV—physical volume
   FN—file name
   FS—file system
   SYS—system
   ERR—a type of error
   PROCESS—a process
   WORKLOAD—a workload
   HOST—a host on a network 2. object_id=the object id. This is a unique string (within any particular type) that identifies the object of interest.
3. hour day_of_week week_of_year month_of_year year julian_day: these are components of the timestamp.
4. attribute_id: name of the attribute that this data represents, e.g., for all FS object, there will be several attributes, including:

size—size of a file system
   percent—percent full for a file system
   mount—mount point for the file system (string)
   type—type of file system (e.g., afs, jfs)

5. attribute_value: the value associated with this attribute. This is the 'actual' data that is recorded in this record. For example, if the type is 'FS', the attribute_id is 'type', then the attribute_value might be 'jfs'.
6. version: an integer indicating the version number of this record. This is intended to allow for applications consuming data from the SM to be sensitive to changes in record format from version to version of the PDS 200 implementations.
7. collection_attributes: This field describes additional information about the attribute_value. In particular, whether the attribute_value is a text string, a boolean value, or a number. Further, if it is numeric, then information about how it was collected (e.g., how many samples) and its units are also recorded. The values are:

I (duration, gap, N, units)—interval average based on N samples/intervals each covering the given duration and separated from the next by the given gap. (All in seconds).

The SM 202 within the PDS 200 records many different types of information. These types are described as units. For example, units can be:

N—number
   pct—a percent
   PPS—number of physical partitions
   DISKS—number of disks
   KBPS—kilobytes per second
   S—seconds
   KB—kilobytes
   PAGES—pages
   PROCS—processes
   MBUFS—message buffers
   MS—milliseconds
   ratio—a ratio
   T—a textual attribute (string)
   B—a boolean (true or false string)

In one embodiment in which SM database 202 is on a flat file, each entry is on a single record, terminated with an end of line (\n). Entries are recorded in time-stamp order.

Collectors 206

Figure 3:
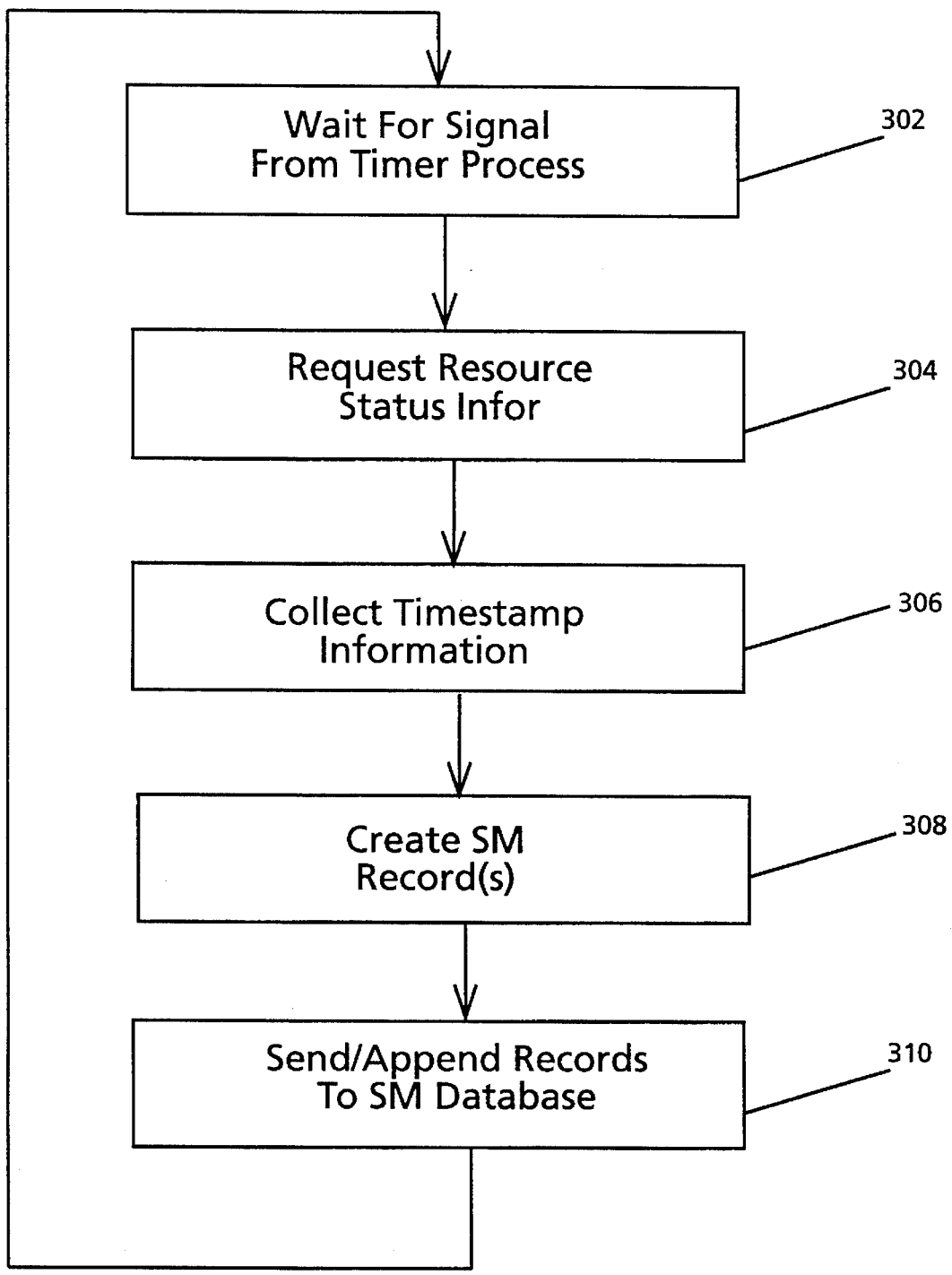
FIG. 3 is a flow chart of the operation of a collector of the PDS of FIG. 2.

Collectors 206 are programs that obtain certain types of data and produce specific SM records. To more particularly describe the operation of an individual collector 206 refer now to the flow chart of FIG. 3. As is seen, initially, the collector 206 receives a signal from timer 214 via step 302. Thereafter the collector 206 will request resource status information from each of the resource managers 102–110 application program interface (RM API) via step 304. Thereafter timestamp information is collected the via step 306. A SM record is then created via step 308. Finally the collector 206 sends or appends these records to the SM database 202 via step 310.

Each collector 206 can have a different collection frequency. For each collector 206 one or more RM APIs are called. Listed below for illustrative purposes are a number a different types of collectors for a UNIX based system together with the types of SM records they produce, the RM API(s) that is invoked, and some illustrative examples.

1. Collector: fn.sh produces the following SM records:
   FN <file name> size invokes the following RM APIs:
   date
   du-sk <file name>

Examples:
   FN /usr/adm/wtmp 09 1 29 07 1994 199 size 4 1 I(0,0,1,KB)
   FN /var/spool/qdaemon 09 1 29 07 1994 199 size 4 1 I(0,0,1,KB)

2. collector: fs.sh produces the following SM records:
   FS <file system name> status
   FS <file system name> mount
   FS <file system name> size
   FS <file system name> percent
   FS <file system name> type invokes the following RM APIs:
   date
   df
   mount Examples:
   FS hd4 09 1 29 07 1994 199 size 40960 1 I(0,0,1,KB)
   FS hd4 09 1 29 07 1994 199 percent 33 1 I(0,0,1,pct)
   FS hd4 09 1 29 07 1994 199 mount / 1 T
   FS hd4 09 1 29 07 1994 199 status avail 1 T
   FS hd4 09 1 29 07 1994 199 type jfs 1 T 3. collector: pv.sh produces the following SM records:
   PV <physical volume> type
   CU <control unit> ndisks
   CU <control unit> sdisks
   PV <physical volume> locCU
   PV <physical volume> pctavail
   PV <physical volume> stgavail
   PV <physical volume> util
   PV <physical volume> kbps invokes the following RM APIs:
   date
   lscfg
   lspy
   iostat -d 2 20

Examples:
PV hdisk0 09 1 29 07 1994 199 type SCSI 1 T
PV hdisk1 09 1 29 07 1994 199 type SCSI 1 T
CU scsi0 09 1 29 07 1994 199 ndisks 4 1 I(0,0,1,DISKS)
CU scsi0 09 1 29 07 1994 199 sdisks 2140 I(0,0,1,MB)
PV hdisk0 09 1 29 07 1994 199 locCU scsi0 1 T
PV hdisk1 09 1 29 07 1994 199 locCU scsi0 1 T
PV hdisk0 09 1 29 07 1994 199 pctavail 0 1 I(0,0,1,pct)
PV hdisk0 09 1 29 07 1994 199 stgavail 0 1 I (0,0,1,MB)
PV hdisk1 09 1 29 07 1994 199 pctavail 54.0881 1 I(0,0,1,pct)
PV hdisk1 09 1 29 07 1994 199 stgavail 334 0 1 I(0,0,1,MB)
PV hdisk0 09 1 29 07 1994 199 util 24.6316 1 I(2,2,20, pct)
PV hdisk0 09 1 29 07 1994 199 kbps 10.7895 1 I(2,2, 20,KBPS)
PV hdisk1 09 1 29 07 1994 199 util 2 1 I(2,2,20,pct)
PV hdisk1 09 1 29 07 1994 199 kbps 1.21053 1 I(2,2, 20,KBPS)

4. collector: mem.sh
produces the following SM records:
    SYS sys0 memsize
    SYS sys0 mbuf
invokes the following RM APIs:
    date
    lscfg
    memstat -m
Examples:
SYS sys0 09 1 29 07 1994 199 memsize 64 1 I(0,0,1,MB)
SYS sys0 09 1 29 07 1994 199 mbuf 30 1 I (0,0,1, MBUFS)

5. collector: err.sh
produces the following SM records:
    ERR H count
    ERR S count
invokes the following RM APIs:
    date
    errpt -d H
    errpt -d S
Examples:
ERR H 09 1 29 07 1994 199 count 4 1 I(0,0,1,N)
ERR S 09 1 29 07 1994 199 count 7 1 I(0,0,1,N)

6. collector: paging.sh
produces the following SM records:
    PS <paging space> size
    PS <paging space> amount
    PS <paging space> active
    PS <paging space> locPV
    PV <paging space> npaging
    PV <paging space> spaging
invokes the following RM APIs:
    date
    lsps -a
Examples:
PS hd6 09 1 29 07 1994 199 size 64 1 I(0,0,1,MB)
PS hd6 09 1 29 07 1994 199 amount 16 1 I(0,0,1,MB)
PS hd6 09 1 29 07 1994 199 active true 1 B
PS hd6 09 1 29 07 1994 199 locPV hdisk0 1 T
PV hdisk0 09 1 29 07 1994 199 npaging 1 1 I(0,0,1,N)
PV hdisk0 09 1 29 07 1994 199 spaging 64 1 I(0,0,1,MB)

7. collector: lsatrr.sh
produces the following SM records:
    SYS sys0 maxpout
    SYS sys0 minpout
    SYS sys0 memscrub
    SYS sys0 maxuproc
    SYS sys0 iopacing
invokes the following RM APIs:
    date
    lssatr -E -1 sys0
    hostname
Examples:
SYS sys0 09 1 29 07 1994 199 maxuproc 100 1 I(0,0,1, PROC)
SYS sys0 09 1 29 07 1994 199 maxpout 0 1 I(0,0,1, PAGES)
SYS sys0 09 1 29 07 1994 199 minpout 0 1 I(0,0,1, PAGES)
SYS sys0 09 1 29 07 1994 199 memscrub false 1 B
SYS sys0 09 1 29 07 1994 199 iopacing false 1 B 8. collector: processes.sh
produces the following SM records:
    PROCESS <process id> cpu1
    PROCESS <process id> cpu2
    PROCESS <process id> cpu3
invokes the following RM APIs:
    date
    ps avcg
Examples:
PROCESS 516 09 1 29 07 1994 199 cpu1 98.7 1 I(0,0,1,pct)
PROCESS 12760 09 1 29 07 1994 199 cpu2 0.5 1 I(0,0,1,pct)
PROCESS 1032 09 1 29 07 1994 199 cpu3 0.4 1 I(0,0,1,pct)

9. collector: network.sh
produces the following SM records:
    HOST <host name/address> loss
    HOST <host name/address> avgping
invokes the following RM APIs:
    date
    netstat -F inet
    hostent -S
    namerslv -s -Z
Examples:
HOST leperc.austin.ibm.com 09 1 29 07 1994 199 loss 100 1 I(0,0,5,pct)
HOST ausvm6.austin.ibm.com 09 1 29 07 1994 199 loss 0 1 I(0,0,5,pct)
HOST ausvm6.austin.ibm.com 09 1 29 07 1994 199 avgping 61 1 I(0,0,5,MS)

10. collector: workload.sh
produces the following SM records:
    WORKLOAD nusers value
    WORKLOAD nprocesses value
    WORKLOAD cp value
    USER <userid> nprocs
invokes the following RM APIs:
    date
    uptime
    pc aucg
    timex
    ps avg Examples:
WORKLOAD nusers 09 1 29 07 1994 199 value 10 1 I(0,0,1,N)
WORKLOAD nprocesses 09 1 29 07 1994 199 value 81 1 I(2,2,10,PROCS)
USER root 09 1 29 07 1994 199 nprocs 47 1 I(2,2,10,PROCS)
USER nthomas 09 1 29 07 1994 199 nprocs 1 1 I(2,2,10,PROCS)
USER jimp 09 1 29 07 1994 199 nprocs 5 1 I(2,2,10,PROCS)
WORKLOAD cp 09 2 29 07 1994 200 value 0.025 1 I(0,0,10,S)

11. collector: cpu.sh produces the following SM records:
SYS sys0 uptime invokes the following RM APIs:
date
uptime Examples:
SYS sys0 09 1 29 07 1994 199 uptime 205860 1 I(0,0,1,S)

12. collector: vmm.sh produces the following SM records:
SYS sys0 VMM_lctl_SUM
SYS sys0 VMM_lctl_SUMSQ
SYS sys0 VMM_lctl_EXCEPTIONS invokes the following RM APIs
date
/dev/kmem/ (via pgm getschedparms)
vmstat 1 301

Examples:
SYS sys0 09 1 29 07 1994 199 VMM_lctl_SUM 0 1 I(1,1,300,ratio)
SYS sys0 09 1 29 07 1994 199 VMM_lctl_SUMSQ 0 1 I(1,1,300,ratio)
SYS sys0 09 1 29 07 1994 199 VMM_lctl_EXCEPTIONS 0 1 I(1,1,300,N)

Many other commands can be used by PDS 200 to collect the various data.

RETENTION CONTROL UNIT 208

Figure 4:
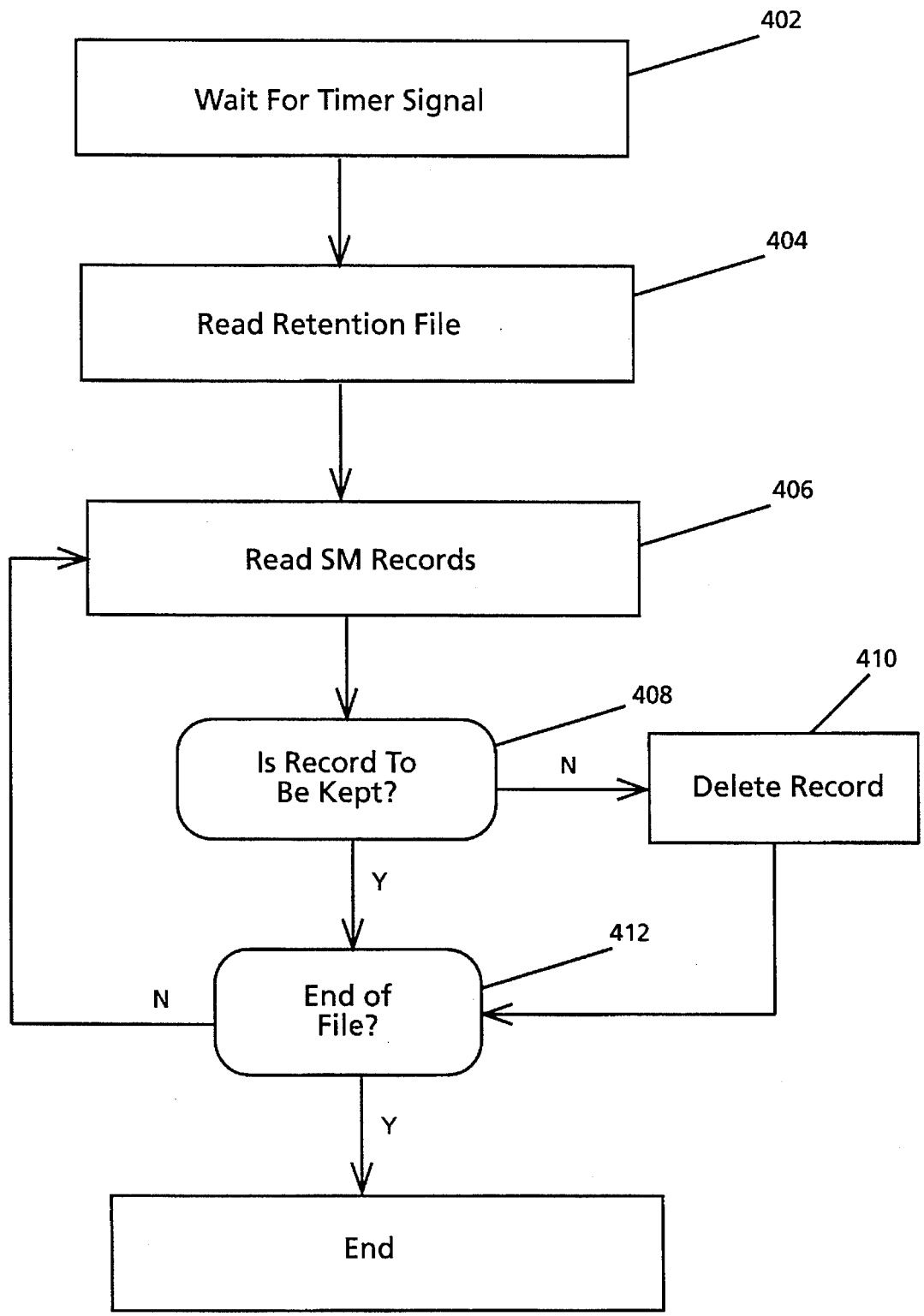
FIG. 4 is a flow chart of the operation of a retention unit of the PDS of FIG. 2.

Periodically, a retention program is run that discards entries in the SM database deemed to be too old. Referring now to FIG. 4 what is shown is a flow chart of the operation of the retention control unit 208. Retention unit 208 waits for signal from timer 214 via step 402. The retention file is then read via step 404. Then the SM records are read via step 406. Next, for each SM record, a determination is made as to whether the SM record is to be kept via step 408. If a record is to be kept, then it is determined if the record is the end of the file via step 412, if the record is the end of the file then the process ends. If the record is not the end of file then return to step 406. If the record is not kept, then delete the file via step 410 and proceed to step 412.

Retention is controllable on a <type, attribute, rectype> basis and is indicated in a retention file.

The format of the retention file is:

| type | attribute | rectype | Ndays |
|------|-----------|---------|-------| where matching type/attribute/rectype SM records can be identified explicitly, or by wildcarding any of the type/attribute/rectype fields.

The retention control unit 208 discards all records in the SM file that are older than the designated retention period. If no retention guidelines are found in the retention file for a particular record, then a default retention period of a predetermined time period is utilized.

CONTROL UNITS 210 and 212

Collection, Retention and Reporting control units 208, 210, 212 are all driven by the same program from a set of timer 214 programs. In a typical UNIX system this program is identified as the cron program. At installation time, several timer entries are created that call the Driver.sh shell program. The single parameter identifies each call with a unique frequency. For example, consider the following timer 214 table entries in a Unix based system:

| | |
|---|---|
| 0 9 * * 1–5 | /usr/lbin/perf/diag_tool/Driver.sh daily |
| 0 10 * * 1–5 | /usr/lbin/perf/diag_tool/Driver.sh daily2 |
| 0 21 * * 6 | /usr/lbin/perf/diag_tool/Driver.sh offweekly |

These will cause the control program to be run once a week day at 9:00 am (with parameter string 'daily'); once a week day at 10:00 am (with parameter string 'daily2') and every Saturday evening at 9:00 pm (with parameter 'offweekly').

The control program in turn calls each of the Collection, Retention and Reporting control units 208, 210, and 212, passing the frequency parameter. Collection, Retention and Reporting actions with matching frequencies are then run. Below is a sample Collection control file in a Unix based system. Each of the collectors 206 is run at the same frequency, 'daily' (of course, the actual frequency depends on the times associated with the 'daily' call to the control program in the timer 214 table):

| | |
|---|---|
| fn.sh | daily |
| fs.sh | daily |
| pv.sh | daily |
| mem.sh | daily |
| err.sh | daily |
| paging.sh | daily |
| lsattr.sh | daily |
| processes.sh | daily |
| network.sh | daily |
| workload.sh | daily |
| cpu.sh | daily |
| vmm.sh | daily |

Below is a sample Retention control file. The retention script is run off-weekly (in this case, 9 pm on Saturdays).

| | |
|---|---|
| retention.sh | offweekly |

Below is a sample reporting control file. In this case, the reporting script is run daily at 10 am.

| | |
|---|---|
| report.sh | daily2 |

Note that this system allows the collectors 206, retention control 208 and reporter 204 to run at different frequencies. This system also allows for relatively simple modifications of the frequencies at which collection, retention and reporting actions are to occur. In the preferred embodiment, only one user's timer 214 table (e.g. the admin user on a UNIX system) is able to drive collection, retention and reporting.

REPORTER 204

Figure 5:
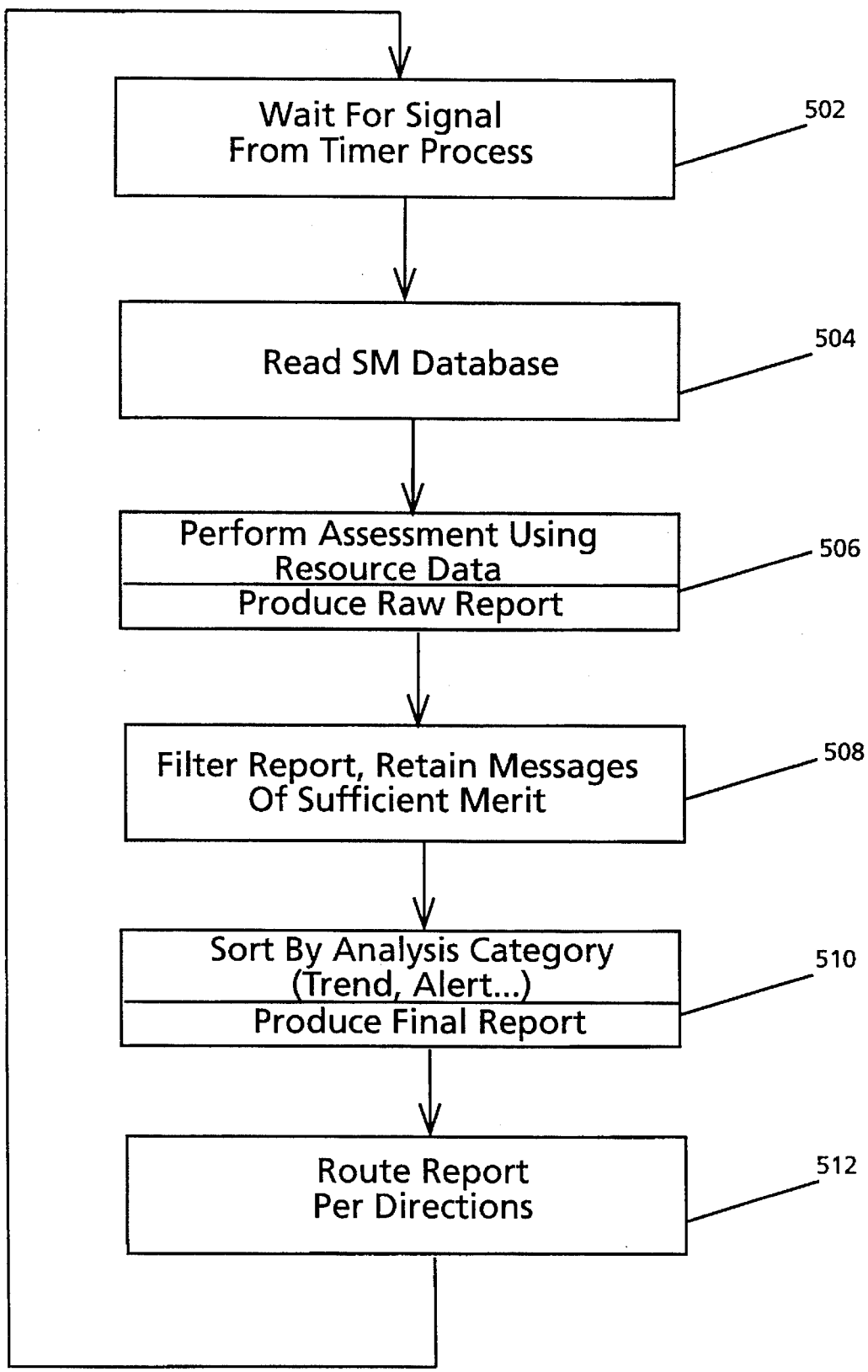
FIG. 5 is a flow chart of operation of a reporter of PDS of FIG. 2.

Reporting is performed periodically. The report writer program reads the SM database and produces a raw report, which is then post-processed yielding a final report. To describe the operation of the reporter 206 refer now to the flow chart of FIG. 5. As is seen in the flow chart, the reporter 204 waits for a signal from timer 214 via step 502. The reporter 206 then reads the SM data via step 504. The reporter performs various assessments and produce a raw report via step 506. These various assessments will be described later in this specification. Thereafter, the report is filtered via step 508. After sorting and analysis by category a final report is produced via step 510. Finally the report is routed in the appropriate manner via step 512.

In a UNIX type system the raw report is written to a particular file. The final report is written to a different file, as well as being e-mailed to the user. An alternative mechanism in a UNIX type system for obtaining a report is also available. By executing a particular program, a copy of the report using the latest measurement data is produced and written.

THE FINAL REPORT

The final report is produced for a specific severity level. The user picks a severity level to produce a particular report. The final report can be organized into sections such as:
1. The header (date, system id, etc.)
2. Alerts
3. Upward Trends
4. Downward Trends
5. System Health Indicators

REPORT CONTENT

The reporter 206 considers various aspects of system configuration and performance. Further, the result of each specific assessment is given a (fixed) severity. When the final report is produced from the raw report, a severity threshold can be input that will be used to filter the raw report's contents.

Several general techniques are used in evaluation. Many of these techniques are utilized to evaluate the performance of the computer system 10. These assessments include but are not limited to BALANCE, OUT-OF RANGE, CONFIGURATION ANOMALY, and TRENDING. These assessments are utilized in the production of a final report. These assessments are described in detail in the before mentioned U.S. patent application Ser. No. 08/301,089.

The present invention is directed toward detecting whether a threshold parameter is appropriately set through operation of the PDS 200. Typically, threshold parameters are utilized by resource managers to define an absolute limit for resource consumption. It is known however, that statistics are often not maintained concerning how often the limit is reached. The system and method in accordance with the present invention provides information regarding these statistics that will in turn allow for a determination that the threshold is appropriately set.

To better understand the operation of the present invention, the following assumptions can be made about both the behavior of resource consumers, and the operation of resource consumption threshold parameters. First, it is assumed that the quantity of consumers' resource demands are normally distributed. [Note that this is not an absolute requirement for this, or similar, techniques to work. However, it provides some formal rationale.] Second it is assumed that requests that exceed the threshold parameter are denied, and the requesting process/user may be terminated.

Figure 6:
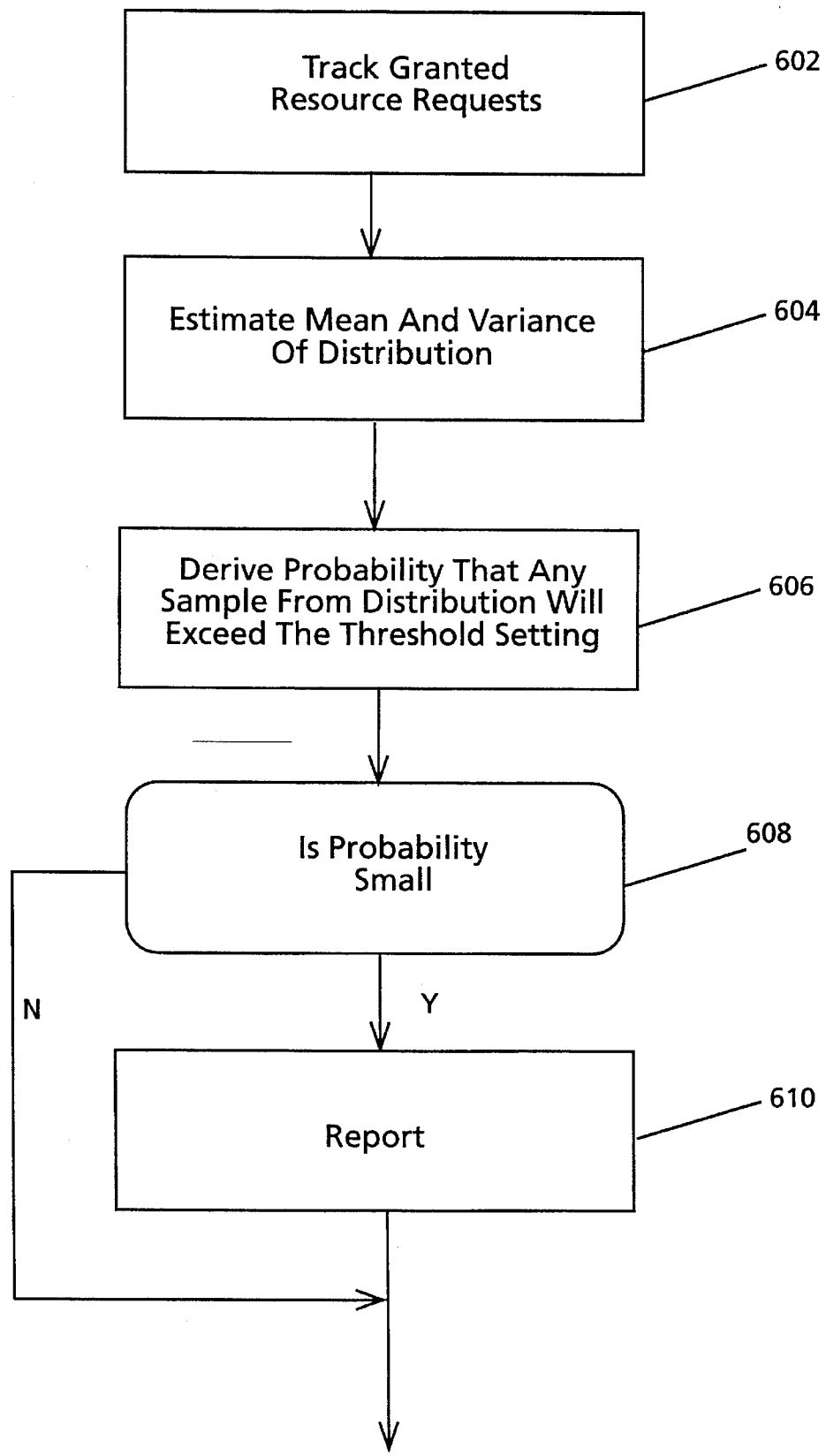
FIG. 6 is a flow chart for detecting whether a threshold is appropriately set in accordance with the present invention.

Referring now to FIG. 6 what is shown is a flow chart for detecting whether a threshold parameter is appropriately set in accordance with the present invention. Initially, granted resource requests for each process/user is tracked, via step 602. Accordingly, the resource requests are then used to estimate the mean and the variance of a normal distribution via step 604 (assuming that all requests are satisfied: which is optimistic). Using this estimated distribution, the probability that any sample from that distribution will exceed the threshold value is derived, via step 606. If that probability is sufficiently large (for example 0.01), then it can be concluded that the user/process is approaching the threshold parameter setting, via step 608. If the probability is sufficiently large a report is generated, via step 610.

Tracking is accomplished with a PDS collector 206 that obtains resource usage information from the appropriate resource manager. Entries (records) are placed in the SM database. At reporting/analysis time the reporter 204 obtains the historical data of resource usage for each process/user. (The extent of this data will depend on the frequency of collection managed by the timer 214 and collector control 210 and the retention criteria for this particular type of data.) In general, at least 30 measurement values for each process/user are required to make this assessment. [So-if measurements are collected once a day, 30 days worth of history is needed in the SM database 202].

The reporter 204 will then, for each process/user, and for each resource managed by the system, evaluate whether or not the process/user's resource usage pattern indicates a tendency to approach the prescribed threshold. The technique is a heuristic based on characterizing the process/user's resource usage as approximately normally distributed, and determining the resulting probability that the process/user would request an amount of resource that approaches the prescribed threshold. If that probability is sufficiently large, then the threshold is indicated as being (possibly) too low or the user/process is indicated as being a particularly heavy user of the resource. The following example illustrates the technique.

(a) assume there is a limit to the number of processes a user is allowed to have active [this is a typical UNIX limitation]. For illustrative purposes this limit will be referred to as "maxuproc".

Figure 7:
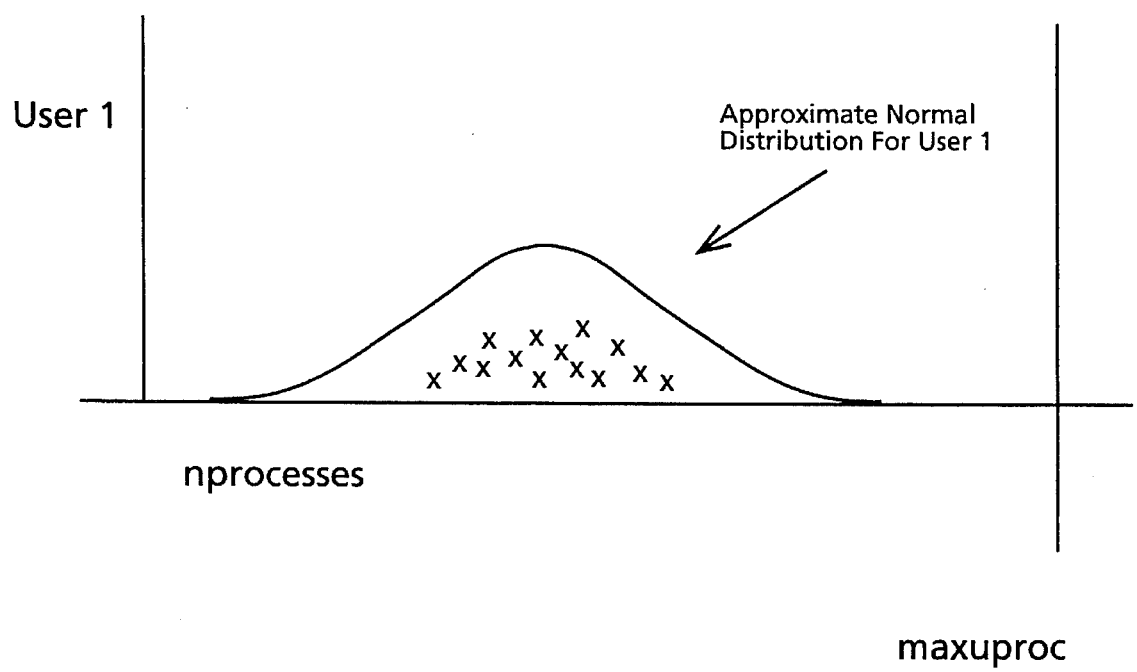
FIGS. 7 and 8 are charts that show an approximation of a normal distribution of resource usage by first and second process/users respectively.
Figure 8:
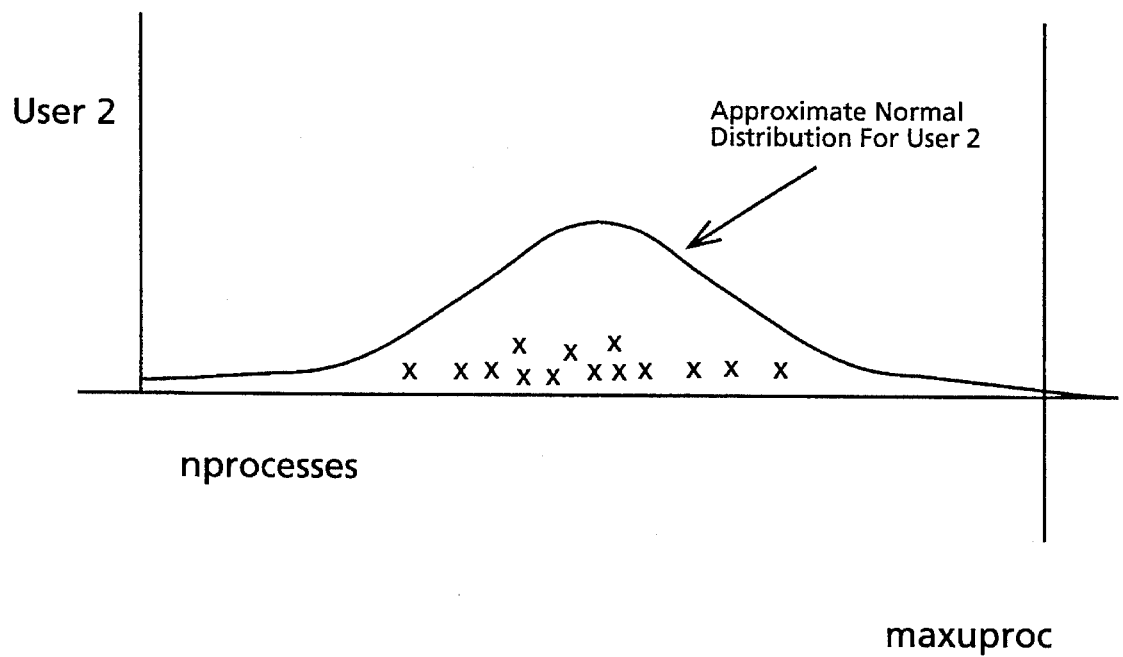

(b) We have collected measurements for the number of active processes for all users for the past 30 days. Shown in FIGS. 7 and 8 are plots of the distribution of two users activities.

(c) As is seen from the Figures
  (1) User 1's activity is relatively 'tightly' clustered about a value far from maxuproc.
  (2) User 2's is widely scattered, and approaches maxuproc.

(d) A technique in accordance with the present invention automates the inspection by determining the mean and standard deviation of each user's activity:

$$\overline{Y}_k = \frac{\sum_{l}^{n} x_{ik}}{n}$$

$$S_k = \sqrt{\frac{\sum_{l} (\overline{Y}_k - X_{ik})^2}{n-1}}$$

where:

n=number of values $x_{ik}$=ith value for user k $\overline{Y}_k$=mean for user k $S_k$=standard deviation for user k (e) Then approximate the data with a normal distribution having the computed mean and standard deviation.

(f) If the probability that the value of the random sample taken from that distribution exceeds the threshold parameter ("maxuproc") is large, then the threshold parameter is identified as being too small OR the user is identified as being a heavy user.

(g) An acceptably small probability is one that limits the number of false positive readings. For example, such a very small cutoff would result in an inappropriate number of warnings about users potentially approaching the maxuproc threshold.

In order to minimize that number a cutoff is chosen that is typically a value of at least 0.01. For the example, such a cut-off implies that a maxuproc value within 2–3 standard deviations of the mean user request amounts is "too close".

Referring again to FIGS. 7 and 8, the probability that a random sample from user 1 reaching maxuproc appears to be extremely small. On the other hand, the probability that a random sample from user 2 appears to be considerably higher. This probability can be derived by examining a table of standard normal probabilities in a typical statistics textbook. Typically, these probabilities are expressed in terms of distance in units of standard deviation.

Note that identifying a process/user as being likely to approach/exceed the threshold parameter setting is not, alone, sufficient reason to change the threshold. However, it might be sufficient reason to notify the computer system administrator that either the threshold parameter is too low, or one particular user/process is performing an activity that is inappropriate (requiring different corrective action). It should also be noted that a method and system in accordance with the present invention will operate effectively for lower bound threshold parameter setting as well as upper bound threshold parameter settings. This process can be utilized to determine whether many different parameters in a computer are appropriately set such as:

maximum threads (small processes) per task maximum open files per process/user maximum virtual memory per process/user maximum CPU consumption rate per process/user maximum number of users logged onto a system maximum open files on a system Although the present invention has been described in accordance with the embodiments shown in the figures, one of ordinary skill in the art recognizes there could be variations to the embodiments and those variations would be within the spirit and scope of the present invention. For example, although the present invention has been described in the context of a particular computer system (UNIX) one of ordinary skill in the art recognizes that a system in accordance with the present invention could be utilized in a variety of computer systems and its use would be within the spirit and scope of the present invention. Accordingly, many modifications may be made by one of ordinary skills in the art without departing from the spirit and scope of present invention, the scope of which is defined by the appended claims.

I claim:

1. A method for detecting whether a consumption threshold parameter is appropriately set in an computer system, the computer system including a plurality of system resources that are controlled by corresponding resource managers, the method comprising the steps of:

(a) tracking a plurality of granted resource requests from at least one of the plurality of resource managers;

(b) estimating a mean and variance from a distribution of the plurality of granted resource requests; and (c) determining a probability that any sample from the distribution will exceed the threshold parameter.

2. The method of claim 1 which further comprises the step of (d) generating a report if the probability is sufficiently large.

3. The method of claim 1 in which the distribution comprises a normal distribution.

4. The method of claim 2 in which probability must be greater than 0.01 to generate a report.

5. The method of claim 1 which the tracking step further comprises obtaining resource usage information from one of the plurality of resource managers.

6. The method of claim 5 in which the estimating step further comprises the steps of:

approximating the resource usage as a normal distribution and determining a mean and standard deviation from the approximated resource usage.

7. A system for detecting whether a consumption threshold parameter is appropriately set in an computer system, the computer system including a plurality of system resources that are controlled by corresponding resource managers, the method comprising the steps of:

means for tracking a plurality of granted resource requests from at least one of the plurality of resource managers;

means responsive to the tracking means for estimating a mean and a variance from a distribution of the plurality of granted resource requests; and means responsive to the estimating means determining a probability that any sample from the distribution will exceed the threshold parameter.

8. The system of claim 7 which further comprises means responsive to the estimating means for generating a report if the probability is sufficiently large.

9. The system of claim 7 in which the distribution comprises a normal distribution.

10. The system of claim 8 in which probability must be greater than 0.01 to generate a report, 11. The system of claim 7 which the tracking means further comprises means for obtaining resource usage information from one of the plurality of resource managers, 12. The system of claim 11 in which the estimating means further comprises:

means responsive to the obtaining step for approximating the resource usage as a normal distribution; and means responsive to the approximating means for determining a mean and standard deviation from the approximated resource usage, 13. A computer readable medium containing program instructions for detecting whether a threshold parameter is appropriately set in a computer system, the computer system including a plurality of resource managers, the program instructions for:

(a) tracking a plurality of granted resource requests from at least one of the plurality of resource managers;

(b) estimating a mean and variance from a distribution of the plurality of granted resource requests; and (c) determining a probability that any sample from the distribution will exceed the threshold parameter.

* * * * *